W. Lowe.
Steam Boiler Furnace.
No. 4,000. Reissued May 31, 1870.
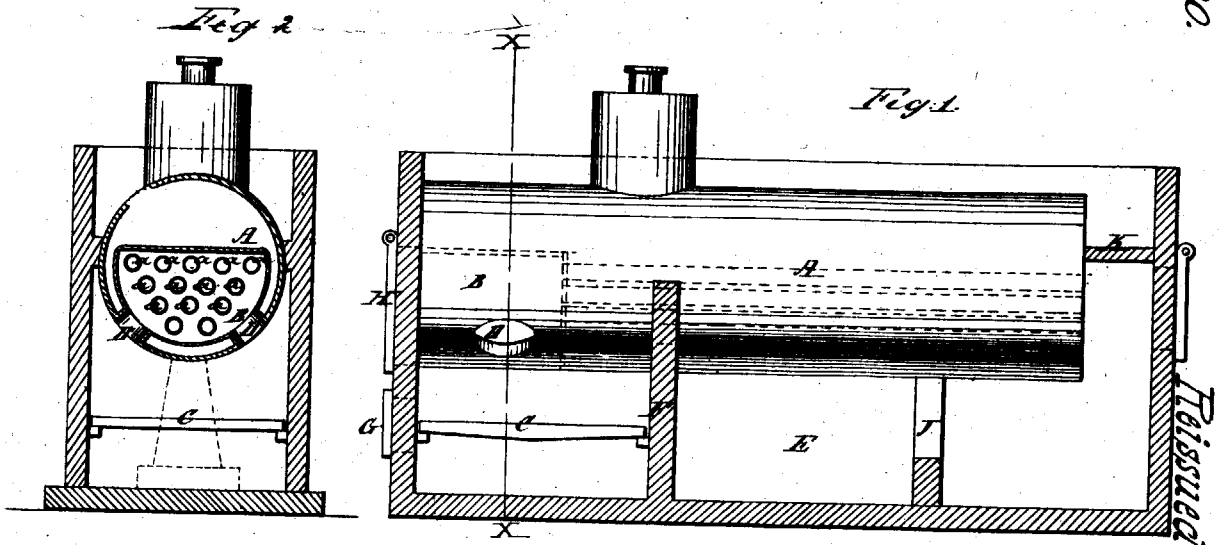
Witnesses
Thos. Fischer
J. A. Serrine
Inventor
William Lowe
Per Munn & Co.
Attorneys

United States Patent Office.

WILLIAM LOWE, OF BRIDGEPORT, CONNECTICUT.

*Letters Patent No.* 65,405, *dated June* 4, 1867; *reissue No.* 4,000, *dated May* 31, 1870.

IMPROVEMENT IN STEAM-GENERATORS.

The Schedule referred to in these Letters Patent and making part of the same.

*To all whom it may concern:*

Be it known that I, WILLIAM LOWE, of Bridgeport, in the county of Fairfield and State of Connecticut, have invented a new and improved Steam-Generator; and I do hereby declare that the following is a full, clear, and exact description thereof, which will enable others skilled in the art to make and use the same, reference being had to the accompanying drawing forming part of this specification.

This invention has for its object to so construct steam-boilers, of all kinds, that the combustion of the gases of the fuel is increased, and fuel, consequently, economized. Many plans have already been introduced for this purpose, but they were inefficient, because the oxygen introduced into the boiler, to consume the gases of combustion, was brought in contact with the latter while they were in the regular channels, and in undisturbed passage. The oxygen could, therefore, not penetrate into the gases, but affected only their outer parts, and the desired effect was, on this account, not produced.

My invention consists in providing a chamber in or on the boiler which contains two apertures, opening from different sides, for admitting the gaseous products of combustion, and a third for the introduction of common air. When these gases, coming from opposite directions, and converging to the center of the chamber conflict, and are undergoing commixture, the air is admitted, and brought into contact with them. Thus is effected a more thorough state of oxidization.

In the accompanying drawing—

Figure 1 represents a side view of my improved steam-generator.

Figure 2 is a vertical transverse section of the same, the place of action being indicated by the line *x x*, fig. 1.

Similar letters of reference indicate corresponding parts.

A, in the drawing, represents a boiler of ordinary or suitable form and size.

At or near its front end is arranged, in its lower part, a chamber, B, from the rear end of which the tubes *a a* project backward.

The chamber is, preferably, directly above the grate C.

The sides of the chamber have, on opposite sides, two or more apertures, D D, which are inclined, as shown in fig. 2.

H is a door which gives access to the combustion-chamber, and through which air or oxygen is admitted to said chamber.

The products of combustion must all pass through the aperture D into the combustion-chamber, whence they pass backward through the tubes *a*, and thence forward again, in suitable manner.

The currents of gases entering the chamber B, through the opposite apertures D, come in conflict in the chamber, and receive, in this disturbed state, the oxygen, which aids in producing more perfect combustion. A blaze will, therefore, pass through the tubes *a*, instead of a current of unconsumed gases.

The wall F, or its equivalent, prevents the products of combustion from escaping from the fire-box, except through the apertures D.

I am aware that mixing-chambers have been used heretofore, in which the gaseous resultants of combustion have been brought into conflict from opposite directions, and that patents were granted March 5th and 19th, 1861, but these I disclaim entirely.

I claim as new and desire to secure by Letters Patent—

The combination of two apertures, one on each side of the combustion-chamber B, to admit the products of combustion from opposite sides, and to bring them in conflict in the center of said chamber with an air-inlet aperture, located relatively as described, and operated to inject a current of air upon the gases while in a state of disturbance, all as and for the purpose specified.

Witnesses:
L. M. SLADE,
W. A. PARROTT.

WILLIAM LOWE.